United States Patent [19]

DiFrank et al.

[11] 3,754,647

[45] Aug. 28, 1973

[54] APPARATUS AND METHOD FOR REMOVING SELECTED SHEETS FROM THE LOWER BRIDGE OF A CORRUGATED PAPER BOARD MANUFACTURING MACHINE

[75] Inventors: Frank J. DiFrank; Walter R. Skudlarek, both of Toledo, Ohio

[73] Assignee: Owens-Illinois, Inc., Toledo, Ohio

[22] Filed: Feb. 22, 1972

[21] Appl. No.: 228,018

[52] U.S. Cl..................... 209/74 R, 271/64, 83/106
[51] Int. Cl............................................... B07c 3/02
[58] Field of Search...................... 209/88 S, 74 R; 271/64, 76; 83/105, 106, 107; 214/11 R

[56] References Cited
UNITED STATES PATENTS

| 3,667,753 | 6/1972 | Norton | 271/64 |
| 2,476,371 | 7/1949 | Navmann | 214/11 |

Primary Examiner—Allen N. Knowles
Assistant Examiner—Gene A. Church
Attorney—Steve M. McLary et al.

[57] ABSTRACT

Apparatus and method for removing selected sheets from the lower bridge of a corrugated paperboard manufacturing machine. In the present invention, a slot is provided in the upper bridge of a corrugated paperboard manufacturing machine. Under the slot, an inclined sorting conveyor is positioned at a point adjacent the lower bridge of the corrugated machine. A hold-down conveyor is also mounted on the upper bridge adjacent to the sorting conveyor such that sheets of corrugated paperboard are drivingly engaged between the two conveyors. When defective sheets of paperboard appear on the lower bridge, the machine operator activates a lever which raises fingers into position to divert the defective sheets. The defective sheets are engaged by the sorting conveyor and the hold-down conveyor and transported through the slot in the upper bridge. Sheets so removed from the stream of production are stacked and stored for disposal in a rack positioned over the upper bridge of the machine.

12 Claims, 5 Drawing Figures

Patented Aug. 28, 1973 3,754,647

Patented Aug. 28, 1973

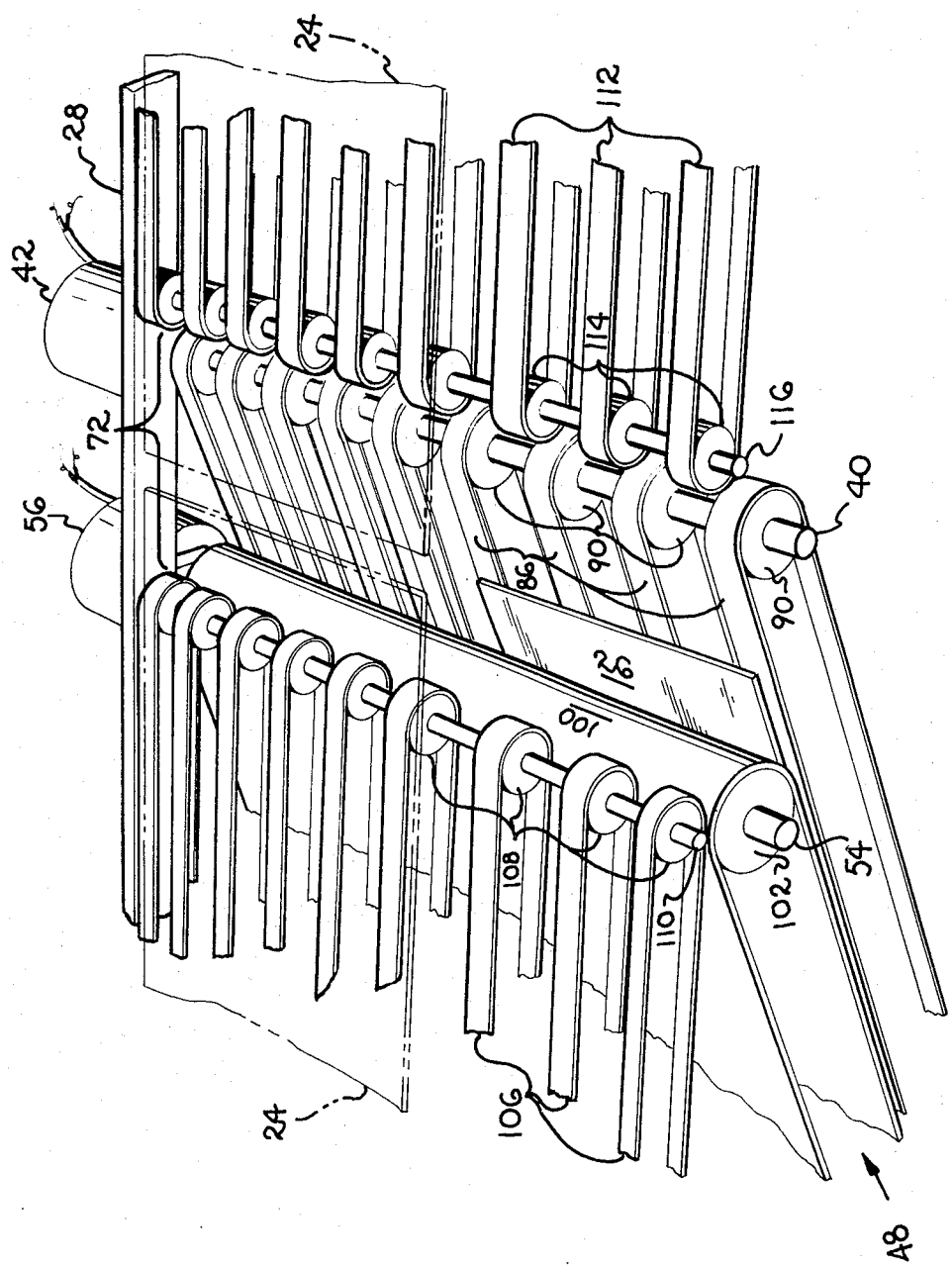

3,754,647

APPARATUS AND METHOD FOR REMOVING SELECTED SHEETS FROM THE LOWER BRIDGE OF A CORRUGATED PAPER BOARD MANUFACTURING MACHINE

BACKGROUND OF THE INVENTION

This invention generally relates to machines for the manufacture of corrugated paperboard. More particularly, this invention relates to apparatus and method for removing selected sheets of paperboard from the lower bridge of such a machine. Most specifically, this invention relates to apparatus and method for selectively diverting sheets of paperboard which exhibit defects to conveyors which propel the rejected sheets through a slot formed in the upper bridge of the machine to a holding rack.

Corrugated paperboard is manufactured in a continuous web of a width of as much as 80 or more inches. As the final step in the manufacturing process, this continuous web is longitudinally slit into several strips of a lesser width. These strips are then diverted to an upper or a lower-bridge assembly near the end of the corrugated manufacturing machine. The purpose of diverting strips up or down is to allow the strips to be transversely slit into discrete sheets of paperboard material of differing lengths. Methods of sorting sheets of material have been known in the prior art, such as the apparatus shown in U.S. Pat. No. 2,476,371. However, to date, no suitable system for removing paperboard sheets from the lower bridge of a corrugated machine has yet been devised. The necessity of removing sheets from the lower bridge results from the occurence of splices in the continuous web of paperboard material. These splices cause disruptions in downstream operation and frequently lead to the jamming of stacking equipment. Previous to this time, the defective sheets on the lower bridge had been diverted downward under the bridge or had been physically removed from the bridge section by the operator. However, this process has not proven satisfactory, since the rejected sheets tend to accumulate underfoot and present an unsatisfactory condition. Those skilled in the art had assumed that it was impossible to reject sheets through the upper-bridge portion. However, we have devised an apparatus and a method which allows defective sheets to be rejected upward through the upper bridge and thus to a location where they may be handled most efficiently.

SUMMARY OF THE INVENTION

This invention is an apparatus for separating selected sheets of corrugated paperboard from a flow of paperboard on the lower bridge of a superposed, two-bridge corrugator comprising means on said lower bridge for deflecting the leading edge of selected sheets upward from the plane of the lower bridge, and means positioned above said lower bridge for grasping and upwardly propelling the deflected sheets through an opening formed in the upper bridge.

BRIEF DESCRIPTION OF THE DRAWINGS

FIG. 4 is a perspective view from above of the upper-bridge area of the apparatus of the present invention illustrating the exit end of the diverting apparatus.

DETAILED DESCRIPTION OF THE DRAWINGS

Figure 1:
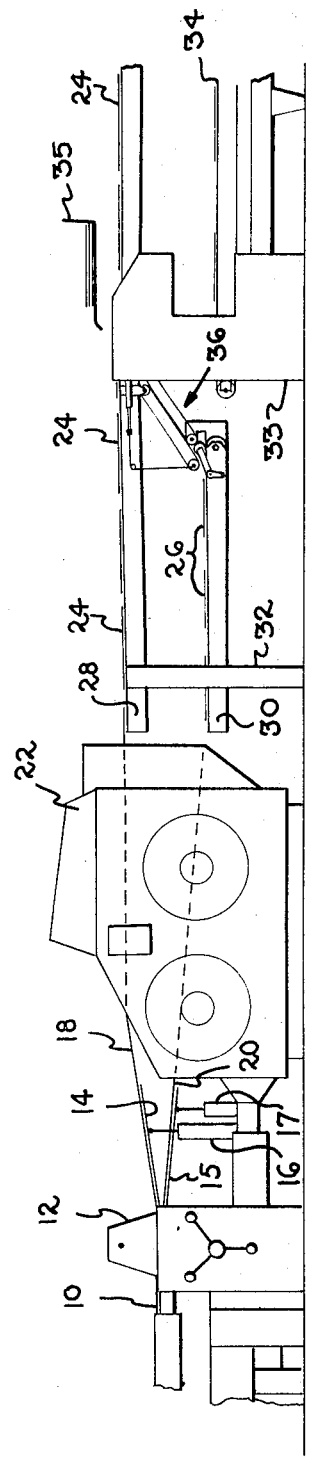
FIG. 1 is a schematic, side-elevational view of the longitudinal and transverse slitting portions of a corrugated paperboard manufacturing machine showing the paper-board-diverting apparatus of the present invention in its operational environment.

As seen in FIG. 1, a continuous web of corrugated paperboard 10 is fed into a longitudinal slitting device 12. The continuous web of paperboard 10 at this point may be eighty inches or more wide. The purpose of the slitting device 12 is to cut the 80-inch width into widths suitable for manufacture into corrugated board products. Thus, the slitting device 12 will normally cut the width of the web 10 into three discrete widths. After the slitting operation, the strips of corrugated material are fed out of the slitting device 12 and are diverted either upward or downward from the original plane of the web 10. The diversion is done by means of diverting slats such as 14 and 15 whose operation is controlled by air motors 16 and 17. For ease of explanation, in this case it has been assumed that the web 10 has been slit into only two strips 18 and 20. However, it should be realized that under normal conditions where three strips are formed, two strips may be diverted upward and one strip downward or vice versa. The purpose in diverting the strips 18 and 20 upward or downward is to allow the now longitudinally slit strips to be transversely cut into individual sheets of paperboard for final processing. The transverse cuts to produce individual sheets are accomplished in the knife section 22. It will be recognized that the knife section 22 contains two independently controlled knives. This allows the upper strip 18 to be transversely cut into individual sheets of one length while the lower strip 20 may be transversely cut into sheets of a different length. Thus, the normal purpose of the knife section 22 is to allow the production of sheets of different lengths from the upper strip 18 and the lower strip 20. The knife section 22 shown in FIG. 1 is one of two possible configurations commonly in commercial use today. The configuration shown in FIG. 1 illustrates a back-to-back knife system. That is, the knife section 22 transversely cuts both the upper strip 18 and the lower strip 20 at essentially the same location along the flow of material. Thus, from the exit of the knife section 22 emerge individual upper sheets 24 and individual lower sheets 26. The upper sheets 24 are fed onto an upper-bridge assembly 28. The lower sheets 26 are fed onto a lower-bridge assembly 30. Suitable support columns 32 and 33 serve to support and separate the upper bridge 28 and lower bridge 30. The term "bridge" has been used to refer to the supporting framework which may be actually seen in FIG. 1. The bridges 28 and 30 in the embodiment shown in FIG. 1 serve to support a plurality of moving belt-type conveyors, best seen in FIGS. 3 and 4, which convey the upper sheets 24 and lower sheets 26 to a take-out conveyor 34. Only the lower take-out conveyor 34 is shown in FIG. 1, it being understood that there is an upper take-out conveyor substantially identical to the lower take-out conveyor 34 but somewhat further downstream and thus not shown.

As previously noted, it is possible to utilize a somewhat different transverse knife-cutting arrangement than that shown in FIG. 1. Those skilled in the corrugating art will readily recognize the differences in the system and a short explanation should suffice to explain the differences. In the alternative system, the transverse cutting is done in what is called a split-knife system. In the split-knife system, only the lower strip 20 is cut into transverse individual sheets 26 immediately after the diverting slats 14 and 15. Thus, the lower bridge 30 in such a case still serves to carry a plural belt conveyor system to move the lower sheets 26 to the lower take-out conveyor 34. However, the upper strip 18 is not cut immediately, but rather is pulled downstream by a separate transverse cutting knife located beyond the lower take-out conveyor 34. In this situation, the upper bridge 28 does not carry a true conveying system, but rather is simply a flat slide plate over which the upper strip 18 is pulled by the transverse cutting knives until it is cut into discrete upper sheets 24.

The sheet-ejecting apparatus, generally designated 36, of the present invention is shown in its operational position in FIG. 1. Due to the small scale of FIG. 1, reference should now be made to FIG. 2 for a fuller understanding of the operation of the sheet-ejecting apparatus 36 of the present invention.

Figure 2:
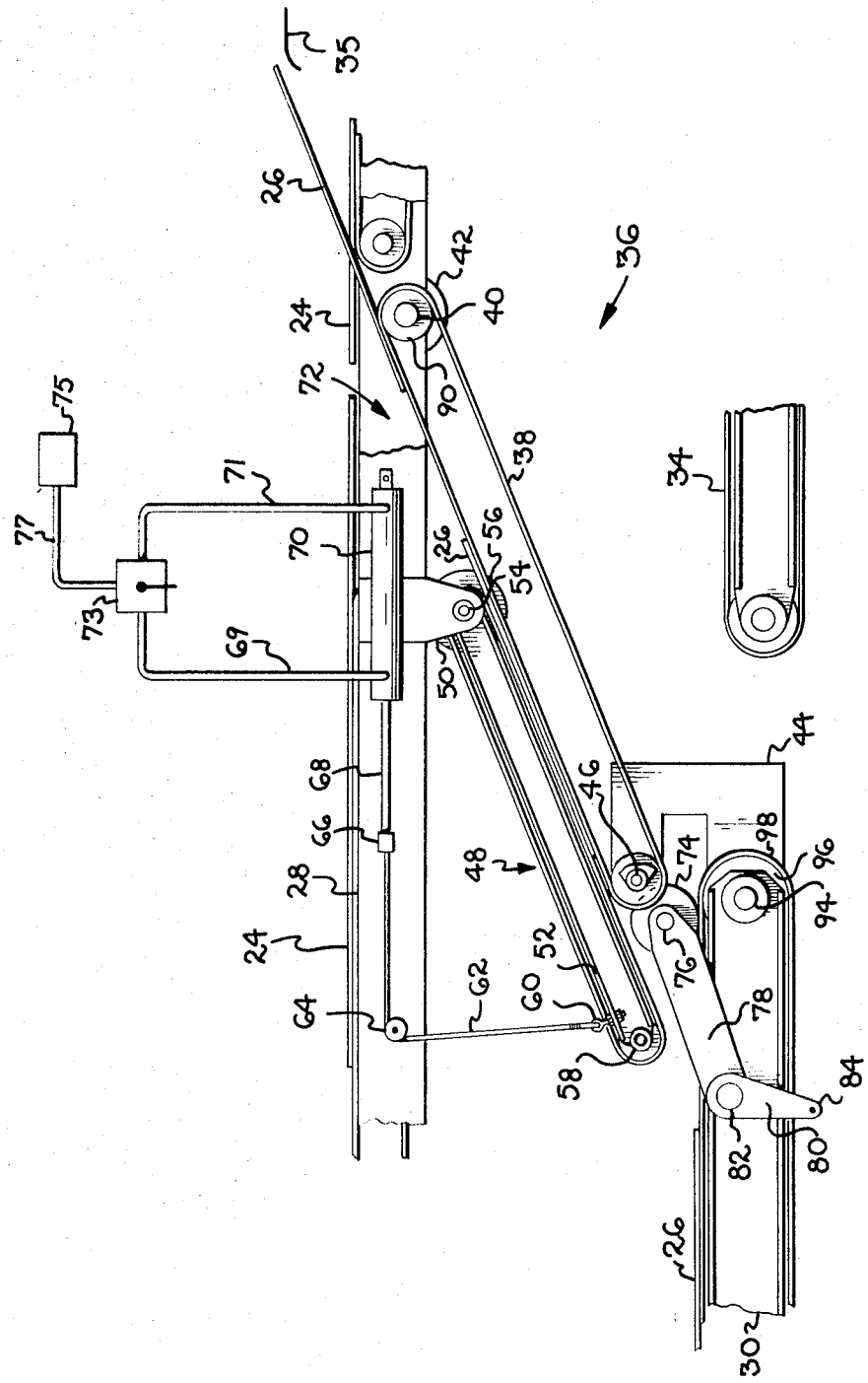
FIG. 2 is a side-elevational view of the apparatus of the present invention.

As seen in FIG. 2, an inclined sorting conveyor 38 has its upper end supported by the upper bridge 28 which carries a rotatable drive shaft 40. The sorting conveyor 38 is driven by an electric motor 42, also carried by the upper bridge 28. The lower portion of the sorting conveyor 38 is supported adjacent the lower bridge 30 by a bracket 44 supported by the lower bridge 30. Mounted in the bracket 44 is a rotatable idler shaft 46 for the lower portion of the sorting conveyor 38. An inclined hold-down conveyor 48 is supported from the upper bridge 28 through two support brackets 50, only one of which is seen in FIG. 2. The hold-down conveyor 48 is further defined by two frame members 52, only one of which is seen in FIG. 2. The frame members 52 extend from the support bracket 50 downward to a point adjacent the lower bridge 30 at a point upstream (it being appreciated that the flow of paperboard is from left to right in FIG. 2) of the termination point of the sorting conveyor 38. It may readily be seen that the hold-down conveyor 48 is positioned so that it overlies the sorting conveyor 38 for a substantial portion of the length of the two conveyors. The hold-down conveyor 48 is pivotally supported on the support brackets 50 by a drive shaft 54 mounted in the support brackets 50. An electric drive motor 56 serves to power the hold-down conveyor 48. An idler shaft 58 is rotatably mounted between the two frame members 52 at the lower end thereof. Adjacent the idler shaft 58, an attachment member 60 is fixed to the frame member 52. The attachment member 60 shown in FIG. 2 is a conventional hook-type member, and serves to attach a cable 62 to the frame member 52. The cable 62 is directed upward and around a sprocket 64. Passing over the sprocket 64, the cable 62 is directed in a substantially horizontal path to a cable connector 66 which attaches the end of the cable 62 to the rod 68 of an air motor 70. The air motor 70 and the sprocket 64 are both attached to the upper bridge 28. With the rod 68 of the air motor 70 extended as shown in FIG. 2, the hold-down conveyor 48 overlies the sorting conveyor 38 in such a manner that any sheets 26 which are passed between the two conveyors will be grasped and engaged in such a manner that they will be fed up the length of the sorting conveyor 38. If the rod 68 of the air motor 70 is retracted, the lower end of the hold-down conveyor 48 will be raised upward, thus providing an open space in which any necessary maintenance work may be done. This feature is also useful in the event that a sheet 26 should jam between the hold-down conveyor 48 and the sorting conveyor 38. The air motor 70 is cycled by the introduction of air under pressure through the inlet line 71 or outlet line 69 under the control of a suitable valving system. One such system could be a hand-operated four-way valve 73 connected to a source of high-pressure air 75 by a suitable pipeline 77. A portion of the upper bridge 28 is cut away in FIG. 2 to show a transverse slot or opening 72 through which sheets 26 that are diverted from the lower bridge are passed onto the upper bridge 28. This transverse slot 72 thus divides the upper-bridge paperboard supporting surface into two distinct segments. These segments will best be understood by reference to FIGS. 4 and 5 and will be discussed in conjunction with these drawings. A series of non-powered pressure rolls 74 are mounted on a shaft 76 carried by a pivot arm 78 attached to the lower bridge 30. The pressure rolls 74 serve the purpose of keeping the sheets 26 in contact with the conveying surface of the lower bridge 30. In addition, a connecting rod 80 is attached to a rock shaft 82 which carries a plurality of spaced fingers 92 for diverting sheets 26 (see FIG. 3). A crank 84 is located at the end of the connecting rod 80 to allow an operator to rotate the connecting rod 80 to raise the fingers 92 and thus divert sheets 26 into the nip of the hold-down and sorting conveyors 48 and 38.

Figure 3:
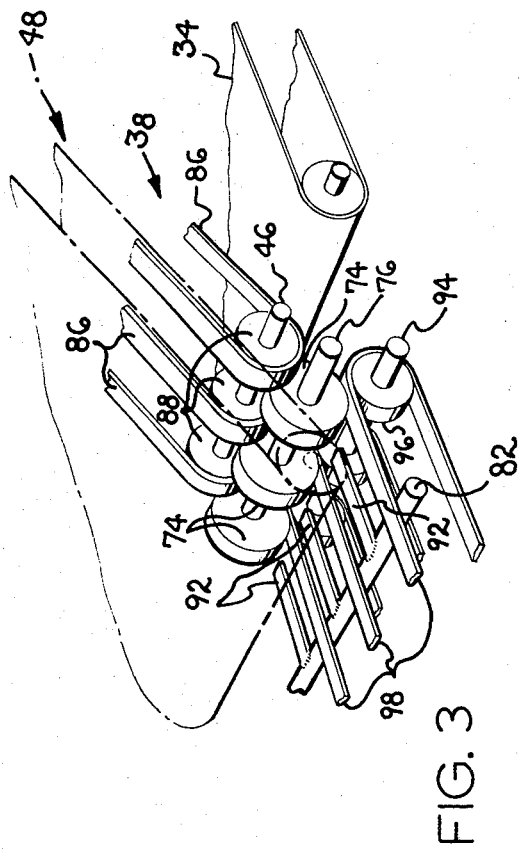
FIG. 3 is a perspective view of the paper pickup portion of the apparatus of the present invention (shown in FIG. 2)

Turning now to FIG. 3, it may be seen that the hold-down conveyor 48 is shown in phantom lines. This is done solely for the purposes of clarity, since the hold-down conveyor 48 actually completely overlies the sorting conveyor 38 and would, if fully drawn, hide the features of the sorting conveyor 38 which it is desired to illustrate. The actual configuration of the hold-down conveyor 48 may best be seen by reference to FIGS. 4 and 5. The sorting conveyor 38 is actually composed of a number of endless conveyor belts 86 trained around idler sprockets 88 carried by the idler shaft 46 and corresponding drive sprockets 90 (see FIG. 4) carried by the drive shaft 40. The idler shaft 46 and drive shaft 40 carry a plurality of idler sprockets 88 and drive sprockets 90 extending substantially across the entire width of both bridges 28 and 30. This, of course, means that there is a corresponding plurality of conveyor belts 86 which effectively span the width of the lower bridge 30. It may be appreciated that the widths of the lower bridge 30 and the upper bridge 28 are substantially equal. It may also be seen in FIG. 3 that a plurality of pressure rolls 74 are carried by the pressure roll shaft 76. Again, these pressure rolls 74 are spaced substantially across the entire width of the lower bridge 30. In FIG. 3, the connecting rod 80 which moves the rock shaft 82 has been removed for clarity. It may be seen that the rock shaft 82 carries a plurality of lifting fingers 92 on it. The lower bridge 30 has been removed in FIG. 3 so that the conveying system for the lower bridge may be seen. A drive shaft 94 carries a plurality of drive sprockets 96. The drive shaft 94 is rotatably supported by both sides of the lower bridge 30. The drive shaft 94 is driven in the usual manner by suitable drive means which is not shown. The plurality of drive sprockets 96 are spaced on the shaft 94 and span substantially the entire width of the lower bridge 30. It may be appreciated that at the opposite end of the lower bridge there is a corresponding idler shaft and idler sprockets which are not shown. A plurality of endless conveyor belts 98 are trained around the drive sprockets 96 and the idler sprockets to form a conveying surface for the lower bridge 30. Thus, it can be seen that paperboard sheets 26 moving along the lower bridge 30 are conveyed by the multiple conveyor belts 98. When a sheet containing a splice reaches the vicinity of the fingers 92, the operator of the machine moves the crank 84, in turn rotating or rocking the connecting rod 80 and the shaft 82. This motion raises the lifting fingers 92 and thus deflects the sheet 26 upward over the pressure rolls 74. The net result is that the sheet 26 is trapped between the hold-down conveyor 48 and the sorting conveyor 38 and is moved upward along the incline of the conveyor 38 toward the transverse slot 72 in the upper bridge 28.

FIG. 4 clearly illustrates the emergence of a rejected lower sheet 26 through the transverse slot 72 in the upper bridge 28. It may also be noted that there will always be a gap available in the stream of sheets 24 on the upper bridge 28 which allows passage of the rejected lower sheet 26. That is, it will be recalled that at the point at which the slit strips 18 and 20 are diverted, a portion of the entire width of the continuous web 10 goes up and a portion goes down. Thus, since the bridges 28 and 30 are the full width of the continuous web 10, a space will occur where the corresponding strip has been diverted up or down. In the case illustrated in FIG. 4, the space occurs on the outside of the upper bridge 28. That is, sheets 24 are conveyed only on the inside portion of the width of the upper bridge 28. Conversely, lower sheets 26 are conveyed only on the outside portion width of the lower bridge 30. Thus, when a rejected sheet 26 exits through the transverse slot 72, there is no material in its path of progress, and it may be easily diverted into a holding bin 35 supported above the upper bridge 28. The hold-down conveyor 48 may now be seen to be a continuous belt-type conveyor which extends the entire width of the upper bridge 28 and the lower bridge 30. This is in contrast to the configuration of the sorting conveyor 38 which is made up of a plurality of conveyor belts 86. The conveyor 48 is composed of a conveyor belt 100 trained around an upper-drive roll 102 and a lower-idler roll 104 (see FIG. 2). In addition, the paperboard supporting surface of the upper bridge 28, in the embodiment shown in FIG. 4, is made up of two distinct conveyor sections. The upstream conveyor section is made up of a plurality of endless conveyor belts 106 trained over a plurality of drive sprockets 108 carried by a drive shaft 110. At the end of the upper conveying unit adjacent the slitting unit 22, there is a corresponding series of idler sprockets and an idler shaft which are not shown. In the apparatus of the prior art, this upper conveying system was continuous and thus substantially identical to the conveying system previously discussed in conjunction with the lower bridge 30. However, to provide the transverse gap 72, the upper bridge 28 conveying system has been split into the two distinct portions shown in FIG. 4. The downstream portion of the upper bridge 28 conveying system may be seen to be likewise comprised of a plurality of endless driven belts 112 trained over a corresponding plurality of idler sprockets 114 carried by an idler shaft 116. At the termination of the downstream section of the split conveyor for the upper bridge 28, there will be a corresponding plurality of driven sprockets and a drive shaft (not shown). The split upper-conveyor system may be driven from a common drive means through a chain-drive system which is not shown.

Figure 5:
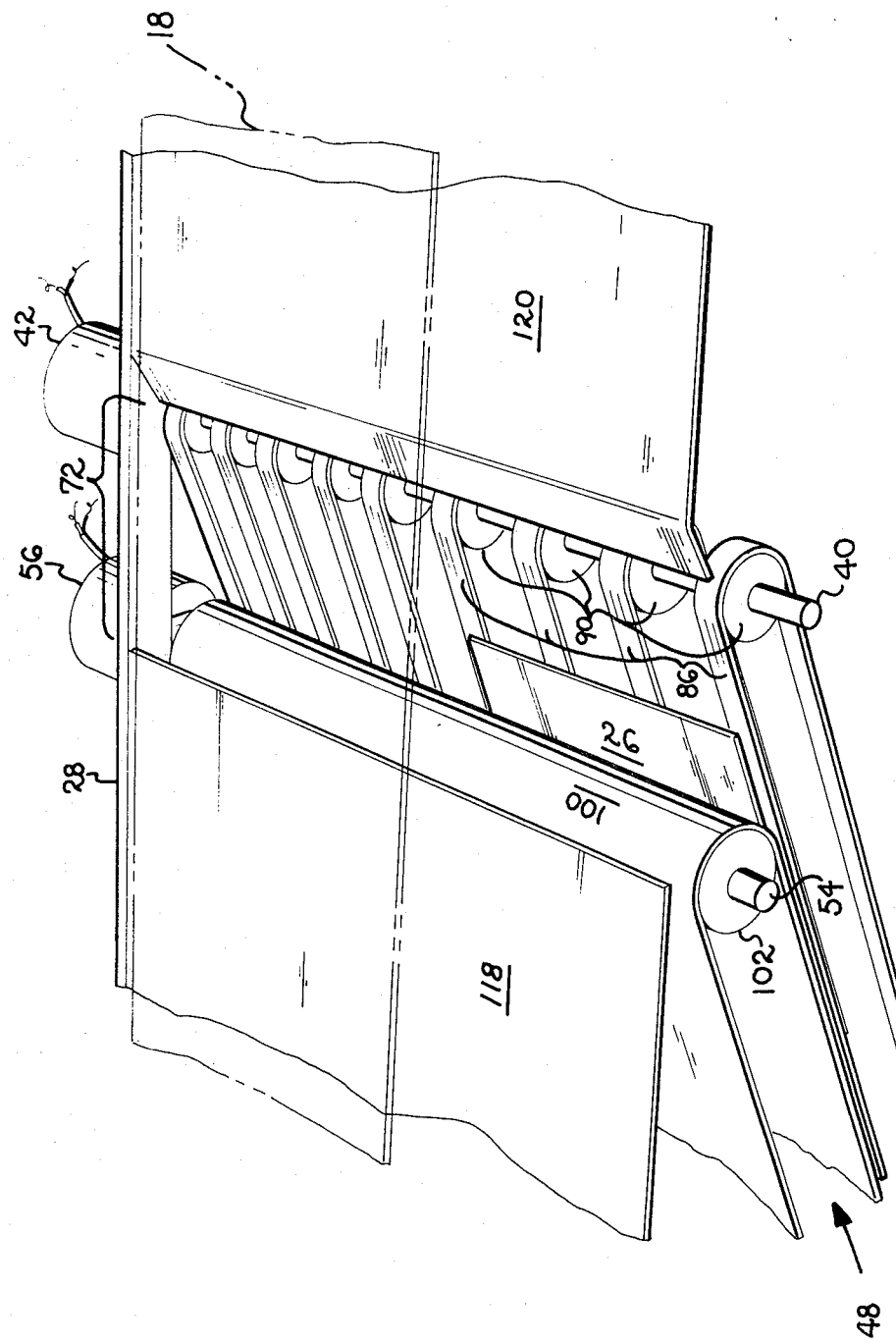
FIG. 5 is a view similar to FIG. 4 illustrating the invention as applied to an alternative design of the surface of the top bridge of the corrugated paperboard machine.

FIG. 5 illustrates a second configuration or design of the upper bridge 28 which is used when the split-knife system discussed in conjunction with FIG. 1 is utilized rather than the back-to-back knife system which is illustrated in FIG. 1. The apparatus of the present invention is identical, whichever system is used; therefore, the same reference numerals for the present apparatus are used in FIG. 5 as are used in FIG. 4. It will be noted that the major difference is that the upper conveying system shown in FIG. 4 has been replaced by a downstream slide plate 120 and an upstream slide plate 118. The transverse slot 72 through which the rejected sheets 26 may pass is now formed by the separation of the slide plate into a downstream slide plate 120 and upstream slide plate 118. It will also be noted that in this configuration, the paperboard traveling over the upper bridge 28 is no longer in the form of individual upper sheets 24, but rather retains its identity as a continuous strip 18, being cut into individual sheets 24 only after it has passed over the upper bridge 18.

It may now be appreciated that the apparatus of the present invention will function to reject selected lower sheets 26 regardless of the knife system utilized and regardless of the configuration of the paperboard on the upper bridge 28. The general operation of the apparatus of the present invention is as follows: the operator of the slitting equipment will receive a warning from the operator of the corrugating section that a splice has been made in the paperboard. Upon receipt of this warning, the operator will position himself adjacent the connecting rod 80 and crank 84. He will then observe the passing sheets 26 until such time as he sees the approach of the sheet 26 which carries the splice that is to be removed. It should be noted that more than one sheet 26 may show evidence of the splice in the paperboard, and the operator may accordingly reject two or more sheets as the circumstances require. When the sheet 26 which is to be rejected approaches the vicinity of the lifting fingers 92, the operator moves the crank 84, thereby moving the connecting rod 80 and the rock shaft 82. This motion pivots the lifting fingers 92 upward and diverts the sheet 26 over the pressure rolls 74 and brings it into engagement with the hold-down conveyor 48 and the sorting conveyor 38. At this point, the hold-down conveyor 48 and the sorting conveyor 38 drivingly engage the sheet 26 and force it upward and out the transverse slot 72 in the upper bridge 28. The rejected sheet 26 is forced into the holding bin 35 by virtue of the velocity imparted to it from the hold-down conveyor 48 and the sorting conveyor 38.

It should be clear that the upward velocity of the hold-down conveyor 48 and the sorting conveyor 38 must be greater than the velocity of the sheets 26 along the lower bridge 30. If this were not so, a directed sheet 26 would be slowed as it started upward toward the transverse slot 72. In such a case, the diverted sheet 26 could be rammed by a following sheet 26, thus leading to a jam in the flow.

In addition, the upstream portion of the hold-down conveyor 48 which does not overlie the sorting conveyor 38 serves an important guiding function. As a sheet 26 is diverted upward by the fingers 92, the sheet will strike the underside of this upstream portion of the hold-down conveyor 48. This will help guide the sheet 26 over the pressure rolls 74 until it is caught in the nip between the hold-down conveyor 48 and the sorting conveyor 38.

What I claim is:

1. Apparatus for removing selected sheets from a lower bridge of a machine for manufacturing corrugated paperboard which longitudinally splits a continuous web of paperboard into a plurality of strips and diverts a portion of said strips to an upper bridge and the remainder of said strips to a lower bridge, the strips being diverted to the lower bridge having been transversely slit into discrete sheets subsequent to diversion and prior to entering onto said lower bridge, comprising, in combination: an upper-bridge paperboard supporting surface split into two discrete segments defining a transverse opening extending the full width of said upper bridge; means located intermediate said upper and lower bridges below said transverse opening for transporting sheets of paperboard from said lower bridge to said upper bridge through said transverse opening; and selectively operable sheet-engaging means located adjacent said lower bridge for diverting selected sheets of paperboard from said lower bridge into said means for transporting sheets of paperboard from said lower bridge to said upper bridge.

2. The apparatus of claim 1, wherein said means for transporting sheets of paperboard from said lower bridge to said upper bridge through said transverse opening comprises, in combination: an inclined sorting conveyor having one end thereof supported adjacent the downstream side of said transverse opening and having the other end thereof supported adjacent said lower bridge; an inclined hold-down conveyor partially overlying said sorting conveyor, one end of said hold-down conveyor being supported adjacent the upstream side of said transverse opening, and having the other end thereof supported adjacent said lower bridge upstream of said sorting conveyor, the relative vertical positioning of said sorting and hold-down conveyors being such that a sheet of paperboard can be drivingly engaged by both conveyors; and means for driving said sorting and hold-down conveyors such that adjacent surfaces are moving in the direction of said transverse opening.

3. The apparatus of claim 2, wherein said sorting conveyor comprises, in combination: a rotatable drive shaft supported by said upper bridge; a plurality of drive pulleys carried by said drive shaft; a rotatable idler shaft carried by a bracket supported by said lower bridge; a plurality of idler sprockets carried by said idler shaft; and a plurality of endless belts trained over said idler and drive pulleys in sequence.

4. The apparatus of claim 2, wherein said hold-down conveyor comprises, in combination: two spaced-apart, elongated frame members pivotally mounted on two support brackets carried by said upper bridge; a rotatable drive shaft carried by said frame members and said support brackets; a drive roll positioned between said frame members and carried by said drive shaft; a rotatable idler shaft supported by said spaced-apart frame members at the end of said frame members opposite said drive shaft; an idler roll positioned between said frame members and carried by said idler shaft; an endless belt having a width substantially equal to the distance between said frame members trained around said drive and idler rolls; and retractable suspension means carried by said upper bridge for supporting the end of said frame members carrying said idler shaft and idler roll.

5. The apparatus of claim 4, wherein said suspension means comprises, in combination: a cable attachment member fixed to at least one of said frame members adjacent said idler shaft; an air motor mounted on said upper-bridge member having an extensible actuating rod carrying a cable connector on its extending end; a rotatable pulley mounted on said upper bridge substantially on the center line of said air motor and positioned substantially vertically above said cable attachment member; a cable trained over said pulley and attached to said cable attachment member and said cable connector; and means for operating said air motor to raise said hold-down conveyor away from its paperboard-engaging position with said sorting conveyor.

6. The apparatus of claim 1, wherein said selectively operable sheet-engaging means comprises, in combination: a rock shaft pivotally mounted on said lower bridge adjacent said hold-down and sorting conveyors; a plurality of fingers mounted on said rock shaft and normally located in a position below the plane of sheets of paperboard passing over said lower bridge; and an operating lever attached to said rock shaft for pivoting said rock shaft to thereby raise said fingers into a position to intercept and divert sheets of paperboard into engagement with said hold-down and sorting conveyors.

7. The apparatus of claim 1, wherein said upper-bridge paperboard supporting surface comprises a pair of spaced-apart conveyors each composed of a plurality of moving endless conveyor belts.

8. The apparatus of claim 1, wherein said upper-bridge paperboard supporting surface comprises a pair of spaced-apart substantially horizontal slide plates.

9. The apparatus of claim 1, further including a paperboard receiving bin positioned above said upper bridge and substantially in alignment with the downstream edge of said transverse opening for receiving paperboard sheets diverted from said lower bridge.

10. A method of removing selected sheets from a lower bridge of a machine for manufacturing corrugated paperboard which longitudinally splits a continuous web of paperboard into a plurality of strips and diverts a portion of said strips to an upper bridge and the remainder of said strips to a lower bridge, the strips being diverted to the lower bridge having been transversely split into discrete sheets subsequent to diversion and prior to entering onto said bridge, comprising the steps of:

diverting selected sheets upward from the plane of sheet travel along said lower bridge; and propelling said diverted sheet upward through a transverse opening formed in said upper bridge.

11. A method according to claim 10, wherein the step of propelling said diverted sheet upward through a transverse opening formed in said upper bridge comprises the steps of:

confining said selected sheets between two upwardly moving belt conveyors; and transporting said selected sheets at a speed sufficient to pass said sheets through said transverse opening.

12. The method of claim 10, further including the step of stacking said selected sheets in a bin positioned over said upper bridge.

* * * * *